United States Patent [19]

Fürter

[11] Patent Number: 4,786,160

[45] Date of Patent: Nov. 22, 1988

[54] MULTI-FOCAL SPECTACLE LENS HAVING AT LEAST ONE PROGRESSIVE SURFACE

[75] Inventor: Gerhard Fürter, Ellwangen, Fed. Rep. of Germany

[73] Assignee: Carl-Zeiss-Stiftung, Heidenhim/Brenz, Fed. Rep. of Germany

[21] Appl. No.: 859,695

[22] Filed: May 5, 1986

[30] Foreign Application Priority Data

May 14, 1985 [DE] Fed. Rep. of Germany ........ 3517321

[51] Int. Cl.⁴ .............................................. G02C 7/06
[52] U.S. Cl. .................................. 350/169; 350/168; 350/171
[58] Field of Search ................ 351/169, 168, 171, 159

[56] References Cited

U.S. PATENT DOCUMENTS

| | | | |
|---|---|---|---|
| 2,878,721 | 3/1959 | Kanolt | 88/54 |
| 4,055,379 | 10/1977 | Winthrop | 351/169 |
| 4,253,747 | 3/1981 | Maitenaz | 351/169 |
| 4,484,804 | 11/1984 | Mignen | 351/168 |

FOREIGN PATENT DOCUMENTS 3016935 11/1981 Fed. Rep. of Germany .

OTHER PUBLICATIONS

Schulz, "Spline Analysis", Prentice Hall Series in Automatic Computation, Englewood Cliffs, N. J., 1973, pp. 1–9.
Optik 18 (1961) Glatzel, "Ein neues VErfahren zur Automatischen Korrektion Optischer Systeme mit Elektronischen Rechenmaschinen", pp. 577–580.
Optometrie 5 (1984) 208/213, "Neue Spezialglaser fur den Arbeitsmedizinischen und Allgemeinmedizinischen Anwendungsbereich, pp. 208–213.

*Primary Examiner*—John K. Corbin
*Assistant Examiner*—Ronald M. Kachmarik
*Attorney, Agent, or Firm*—Hopgood, Calimafde, Kalil, Blaustein & Judlowe

[57] ABSTRACT

The invention contemplates a multi-focal spectacle lens having two progressive zones which are spatially separated from each other and which provide smooth transition of dioptric power, from one to the next of three different viewing-distance regions. This progressive surface is calculated in accordance with the technique of spline analaysis and is twice continuously differentiable. Such a progressive lens, which is illustratively described for use at computer-screen work stations, has an upper viewing-distance region designed for distant vision, a middle viewing-distance region designed for viewing the computer screen as well as a document arranged alongside the screen, and a lower viewing-distance region designed for near-vision requirements of keyboard operation. Laterally of the near-vision region the power of the lens decreases so that documents lying to the side of the keyboard can also be seen sharply, without moving one's head.

17 Claims, 6 Drawing Sheets

MULTI-FOCAL SPECTACLE LENS HAVING AT LEAST ONE PROGRESSIVE SURFACE

BACKGROUND OF THE INVENTION

The present invention relates to a multi-focal spectacle lens, wherein dioptric power varies progressively between different zones of vision.

Such lenses are referred to generally as progressive lenses, and that surface of the spectacle lens which effects the progressively varying course of the dioptric power of the lens is referred to as the progressive surface. Copending U.S. application Ser. No. 570,589, filed Jan. 13, 1984 is generally descriptive of design principles for a progressive lens.

Progressive lenses are used to compensate for impaired vision of presbyopes (persons whose vision has been impaired by age), in that the power of accommodation of the eye has decreased. To date, progressive lenses for presbyopes have had an upper distance-vision region and a lower near-vision region, and these regions have been connected by a progressive zone. Within said zone, the dioptric powers of the upper and lower regions pass progressively and continuously into each other. Such a progressive lens is made in a single piece; it does not contain any disturbing separation line between the two viewing regions, and it is therefore esthetically very satisfactory. It is also very comfortable for the person wearing the spectacles, since the two viewing regions pass continuously into each other, without any jump in the viewed image, so that the transition from far vision to near vision occurs very naturally.

There are tasks which present difficulties for a person wearing spectacle lenses having two viewing-distance regions. Thus, for example, in the case of a computer-screen work station, the screen is at a viewing distance of 50 to 75 cm while the keyboard is at a viewing distance of 40 to 50 cm, and documents may also have to be viewed at positions alongside the screen and/or alongside the keyboard. In principle, it would be possible in such case to work with spectacle lenses which have only the two regions which correspond to said viewing distances. But certainly, the user would then not clearly see objects or persons away from his work station; i.e., he would have to remove his glasses to look a distance away or, if his vision is impaired, to change them.

To avoid this serious disadvantage, a paper in the journal "Optometrie" 5 (1984), 208/213, proposes special multiple-power lenses having three viewing-distance regions, in the manner of the known trifocal lens. A separation line delimits these regions from each other, and the separation lines are clearly visible; thus, each change in glance from distance vision to the region of the screen, or from the screen region to the region of the keyboard, entails a jump in the image.

The condition is similar in the case of spectacle lenses known from West German Pat. No. 3,127,148 (corresponding to U.S. Pat. No. 4,484,804). Such lenses can have three spherical regions of different dioptric value and all of these regions have a common tangent in the plane of the vertical meridian, i.e., they adjoin each other without seam. However, at lateral offset from this meridian, the viewing regions are connected by a transition surface, wherein seam lines form edges and thus points of optical jump due to the local difference in the involved radii of curvature. It can readily be seen that such a spectacle lens is pervaded by edges and can thus in no way be satisfactory. Furthermore, such a lens cannot be considered a progressive lens since it has jumps in curvature and thus in the action, even along the meridian.

From U.S. Pat. No. 2,878,721, it is known to develop a progressive lens having an extremely long progressive zone. In this way, regions lateral of this zone can be shaped such that they are relatively low in error, over a limited lateral extent. But the vertical distance between distance effect and near effect is too great in the case of such a lens. There is the additional difficulty that such a lens has no regions which are associated with specific fixed viewing distances, so that the user must in every viewing situation incline his head to seek the suitable viewing orientation.

BRIEF STATEMENT OF THE INVENTION

The object of the present invention is to provide a progressive spectacle lens which makes it possible for the user to work suitably and without fatigue in three different viewing-distance regions and which is esthetically satisfying in every respect.

The invention achieves this object in a progressive spectacle lens wherein three viewing-distance regions are vertically separated from each other and wherein two progressive zones are so spaced from each other and in merging vertical interlace with the viewing-distance regions (1) as to progressively and continuously change the dioptric power of the upper region into that of the vertically intermediate region and (2) as to progressively and continuously change the dioptric power of the intermediate region into that of the lower region, the progressive or variable-focus surface in each case being twice continuously differentiable, both nasally and temporally, at least up to a horizontal viewing angle of 25°.

To date, those skilled in the art have experienced great difficulties in developing a progressive lens having two viewing-distance regions and a progression zone between them, wherein the user's vision is disturbed as little as possible by aberration. This fact is apparent from a large number of different proposals, such as those to be found, for example, in West German Pat. Nos. 2,918,310 and 3,016,935 (which correspond with U.S. Pat. Nos. 4,253,747, and 4,606,622 respectively).

These difficulties have caused those skilled in the art to consider it impossible to provide, on the relatively small surface of a variable-focus lens, regions associated with different viewing distances in such manner that they merge continuously into each other via two progressive zones which are vertically spaced from each other, without entailing aberrations of such magnitude as to result in highly questionable utility for the intended progressive lens purpose.

In the present invention, the logic of the progressive-lens design approach of West German Pat. No. 3,016,935 has been followed, namely to calculate the progressive lens in accordance with the mathematical method of spline analysis set forth in the text, "Spline Analysis", by M. H. Schultz (Prentice Hall Series in Automatic Computation, Englewood Cliffs No. 9, 1973). This analysis provides the mathematician with the basis for finding the area equation which finally makes it possible, by means of an optimizing method known, for example, from the journal Optik 18 (1961), page 577, to satisfy meaningful optical requirements in the lens surface. In this case, the requirement must be satisfied that the resulting surface is twice continuously differentiable. The surface resulting from this calculation is an aspherical surface in the most general sense, i.e., its regions are not related to each other by any formula. But such an aspherical surface can be produced with the new CNC-machines available on the market.

By calculating a variable-focus lens of the above nature, namely, with spaced progressive zones in vertical interlace with and continuously merging into spaced different viewing regions, wherein the calculation is effected on basis of thorough optical and ophthalmological knowledge, there surprisingly results a progressive lens which achieves the purpose of the present invention in an unpredictably optimal manner. Refining features which assist in achieving this result will appear from detailed description below, but will be briefly noted here to include:

a. a middle viewing-distance region within the useful field of view in which region the dioptric power varies by not more than a given low fractional multiple of the difference in dioptric power for the greatest and for the shortest of the viewing distances;

b. a lower viewing-distance region in which the dioptric power decreases in laterally outward directions within the useful field of view by at most a given fractional multiple of the difference in dioptric power for the greatest and for the shortest of the viewing distances;

c. a distant-vision region which comprises at least one surface which is described by two adjacent sides of a square or rhombus standing with the included vertex at a point on the principal sight line of the lens at which point the progression commences;

d. a diopter-power relationship for assuring low values of astigmatism throughout the progressive zone of transition between the middle and the lower viewing-distance regions, and for assuring tolerably low values of astigmatism throughout the progressive zone of transition between the upper and the middle distance-viewing regions; and e. adaptation of distortion in lateral areas of the upper viewing-distance region to distortion in the lower viewing-distance region, such that the pattern of distortion throughout the lens is akin to the distortion pattern to which the wearer of spectacles is already accustomed, as in use of his normal reading glasses.

DETAILED DESCRIPTION

The invention will be described in detail in conjunction with the accompanying drawings, illustratively applicable to a progressive spectacle-lens design for use at computer-screen work stations. However, it should be expressly understood that the viewing distances of the viewing regions of the spectacle lens of the invention can also be selected differently, depending upon the particular other task or tasks to be satisfied. For example, in spectacles for use by pilots of transport planes, the middle viewing-distance region serves for distance vision, while the upper and lower viewing-distance regions serve for observing instruments which are at different but closer distances.

Specifically, in said accompanying drawings:

FIG. 5 is a view similar to FIG. 4, but showing lines of constant average surface dioptric power, for the embodiment of FIG. 2a;

FIG. 6 is a chart of sagittae at equidistant point along various horizontal sections over the progressive-lens surface of the embodiment of FIG. 2a; and FIG. 7 shows the distortion of an equidistant-object grid, by a spectacle lens according to the embodiment of FIG. 2a.

Figure 1:
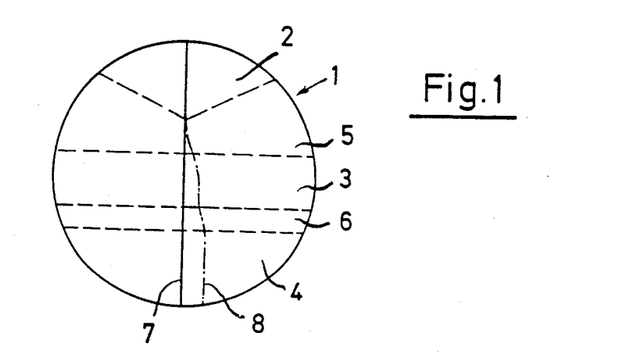
FIG. 1 is a view in front elevation to show a progressive lens of the invention.

FIG. 1 shows a progressive lens 1 developed in accordance with the invention, as seen in plan view of its progressively characterized surface. This lens has an upper viewing-distance region 2, an intermediate or middle viewing-distance region 3, and a lower viewing-distance region 4. An upper progressive zone 5 is interposed between (interlaced with) the viewing-distance regions 2 and 3, while a lower progressive zone 6 is interposed between (interlaced with) the viewing-distance regions 3 and 4. The course of and distances between region/zone separating lines are indicated merely by way of example.

The lens 1 may be developed with a vertical meridian 7, in which case it constitutes a symmetrical lens. It is also possible to develop the lens 1 as an asymmetrical lens which is divided, by a sloping or non-linear principal-sight line 8, into a nasal region and a temporal region, the principal sight line 8 extending as a curve which deviates toward the user's nose, for shorter-distance viewing.

Figure 2:
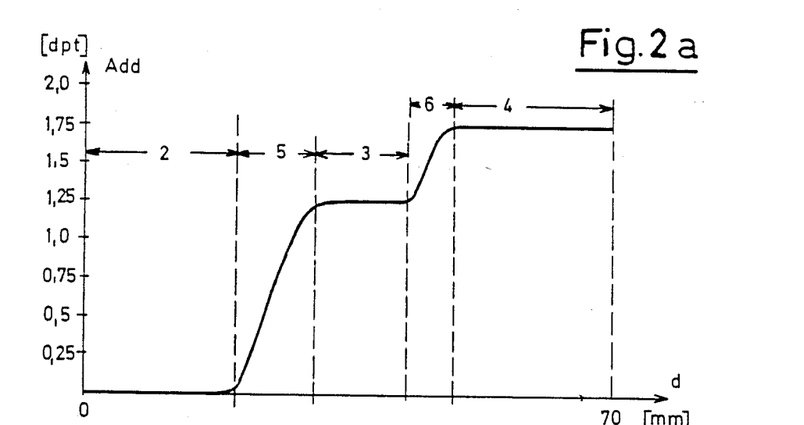
FIG. 2a graphically displays an illustrative distribution of dioptric powers along the meridian of the lens of FIG. 1.
FIG. 2b similarly displays a different distribution of dioptric powers, for another embodiment.

FIG. 2a is an illustrative plot showing the distribution of the dioptric power of the lens 1 along the meridian 7. This same distribution of the dioptric power results along the principal-sight line 8, in the case of an asymmetrical development of lens 1.

Figure 2B:
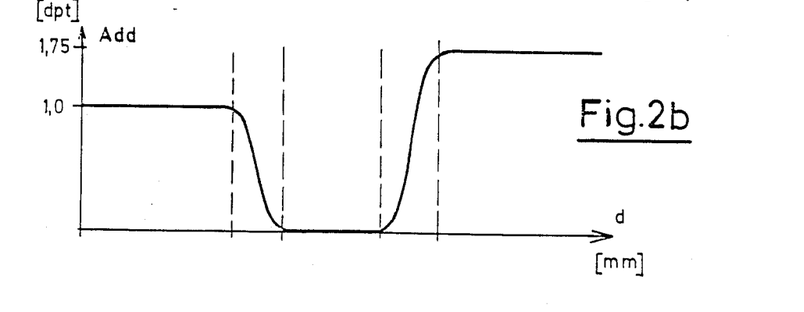

FIG. 2b is a similar plot but for a different illustrative example of dioptric-power distribution, for a progressive lens suitable for use by aircraft pilots.

From FIG. 2a, it can be noted that the lens 1 has a dioptric power of 0 dpt in the upper viewing-distance region 2. In this development of lens 1, this upper region 2 represents the distant-vision region, and it is combined with the other regions 3, 4 to particular advantage when used at computer-screen work stations.

Within the upper progressive zone 5, dioptric power varies continuously, to a value of +1.25 dpt at merger with and throughout the intermediate viewing distance region 3. This region 3 is used for observing the computer screen and possibly a document positioned alongside of it. Within the lower progressive zone 6, dioptric power again varies continuously, to a value of 1.75 diopters at merger with and throughout the lower viewing-distance region 4 which is used for observing the keyboard.

A progressive lens having the dioptric-power distribution shown in FIG. 2a is suitable for a presbyope with normal vision whose power of accommodation, for instance, still covers 1.5 diopters. It is convenient and easy for this presbyope to create an accommodation of 0.75 diopters. Thus in the middle region 3, the assumed presbyope obtains a maximum total effect of $1.25+0.75=2.0$ diopters, which corresponds to a viewing distance of 50 cm; and in the near region 4, he obtains a maximum total effect of $1.75+0.75=2.5$ diopters, which corresponds to a viewing distance of 40 cm.

The greatest viewing distance results when the user's eye is relaxed and does not accommodate. In the example shown, the dioptric power of $+1.25$ diopters is then available in the middle region 3, which, for the relaxed eye, corresponds to a viewing distance of about 80 cm; thus the user, upon looking through the middle region 3, can sharply see, without strain, objects which are at viewing distances between 80 and 50 cm. In the near region 4, an effect of 1.75 diopters is available, which, for the relaxed eye, corresponds to a viewing distance of about 60 cm; thus the observer, upon looking through the near-distance region 4, can sharply see objects which are at viewing distances between 60 and 40 cm.

For the case of a presbyope whose power of accommodation is only 1 diopter, the central region 3 is illustratively characterized by a dioptric power of 1.5 diopters, with the near region 4 having a dioptric power of 2.0 diopters. In this way, clear viewing is possible in region 3 between 70 and 50 cm and in region 4 between 50 and 40 cm.

The foregoing examples show that when a progressive lens is developed in accordance with the examples indicated, relaxed and clear vision of screen, keyboard and copy is realizable for any possible arrangement of their working distances.

Depending upon the user's viewing distance to the computer screen, diopter addition in the middle region 3 should be in the range 0.4 to 0.8 times the maximum diopter addition, namely, the increase in dioptric power between the distance-viewing and near-viewing regions 2 and 4. Other viewing tasks result in a correspondingly different distribution of effect and region sizes (see FIG. 2b).

The calculation of a progressive lens in accordance with the invention will now be discussed. First of all, the eye-side (rear) surface of the lens is selected on basis of required strength (dioptric power), with due consideration of simplicity of manufacture, good appearance and good compatibility. This rear surface may, for example, be spherical; and if astigmatism of the eye is to be corrected, this rear surface may be toric, or atoric.

Second, the object-side (front) surface of the progressive lens is calculated, bearing in mind that the desired strength of the lens is to be obtained cooperatively with the rear surface. This front surface incorporates the progressive features and is divided into the three viewing-distance regions 2, 3, 4; of these, the middle region 3 should have a vertical extent of at least 7 mm, and may range up to about 20 mm, depending upon particular requirements.

Next, the course of the meridian or principal-sight line, i.e., curve 7 or 8, is established. And determinations are made for the vertical extent of the two progressive zones 5, 6 and for the course of dioptric power along the meridian (principal-sight line) in these zones. Finally, it is decided whether astigmatism will be permitted along the principal-sight line, curve 7 or 8. Such astigmatism should not exceed values of 0.5 diopter.

Figure 3:
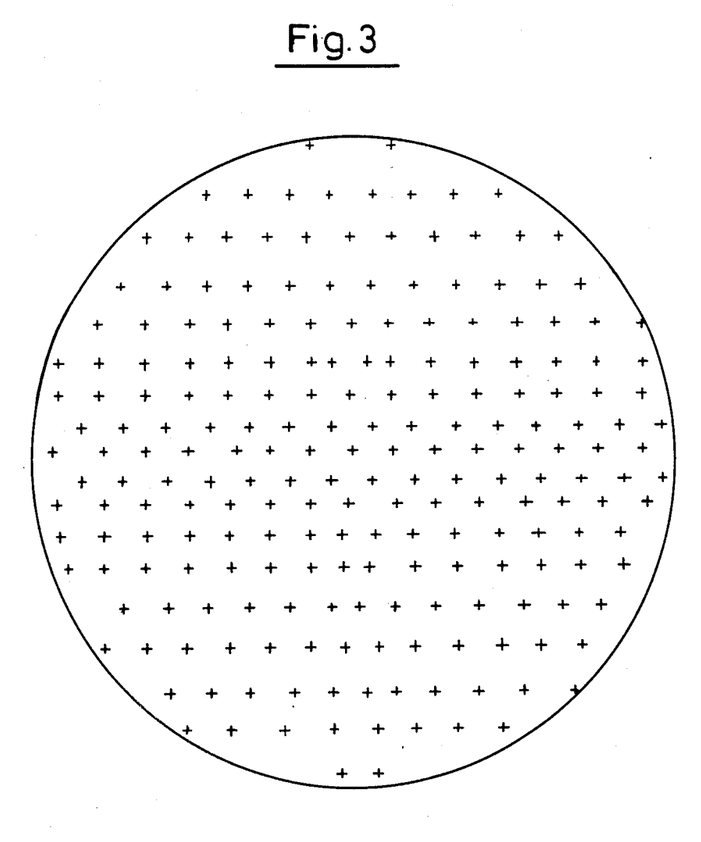
FIG. 3 is another view in front elevation of the lens of FIG. 1, showing the distribution of viewing-axis intercepts over a progressive-lens surface, at which optical demands forming the basis of a presently disclosed calculation are estimated.

The designer then plots on the progressive surface a plurality of dots, so-called "peepholes", the distribution of which is effected on basis of his experience. One such illustrative distribution of the peepholes over a progressive surface for a lens according to FIG. 1 is shown in FIG. 3. At each peephole, the desired dioptric effect (power, astigmatism, prismatic effect) is established. In this connection, it is, in particular, required that:

a. In the central region 3 and within the total useful field of view, the average dioptric effect may vary, to a maximum extent of 30 percent of the total diopter addition. In the present illustrative example, the field of view comprises a horizontal viewing angle of about 25°, nasally and temporally, and the total dioptric addition is the difference between dioptric effects at the viewing-distance regions for the greatest and smallest distances;

b. In the near-vision region 4 and within the useful field of vision, the average dioptric effect may decrease laterally of the principal-sight line, to a maximum extent of one-half of the total diopter addition, thus permitting account to be taken of the fact that a document located alongside the keyboard is at greater distance from the eye than is the keyboard; and c. The distant-vision region 2 comprises at least one surface, which can be described by two adjacent sides of a square or rhombus standing with the included vertex at a point on the principal-sight line and diverging upward and outward of the principal-sight line, said point being where progression commences.

The designer then inserts a network of points which is independent from the distribution of the peepholes, and which is preferably in the form of a uniform grid, over the variable-focus surface, and he starts to calculate the surface with a spline function Sp (X, Y) which appears suitable to him. This initially produces at the peepholes of FIG. 3 given dioptric effects which in general do not agree with the values desired. But his initial calculations are followed by a number of optimization steps which are continued until the surface parameters—preferably, the height (sagittae) of the network points—are so established that the spline function Sp (X, Y) which is defined thereby provides at the peepholes the desired dioptric values with sufficient, attainable precision. This spline function (X, Y) of the surface defines a progressive surface which is twice continuously differentiable, since this is a basic property of every spline function.

If the calculation is performed in the described manner and with the indicated parameters, there results a lens which not only satisfies stated requirements but is additionally characterized as follows:

Within the useful field of view and at lateral transition regions between the middle region 3 and the near region 4, i.e., in the lateral regions of the progressive zone 6, the value of the astigmatism, expressed in diopters, is contained in the range 1.0 to 1.5 (1.0 being preferable) times the total dioptric addition; and Within the useful field of view and at lateral transition regions between the middle region 3 and the distance-vision region 2, i.e., in the lateral regions of the progressive zone 5, the value of the astigmatism, expressed in diopters, does not exceed 3 times, and preferably not 2.5 times, the value of the total dioptric addition.

In this way, the result is obtained, on the one hand, that the useful field of view is completely usable in the middle, near-vision and corresponding transition regions. The glance of the user can therefore travel between screen, copy and keyboard without being limited by disturbing imaging errors. For example, normal writing can still be clearly read with a value of astigmatism of 1 diopter.

On the other hand, disturbances of the field of view in the transition region between middle and distance vision regions are tolerably slight, in view of the fact that values of the astigmatism are maintained within the limits indicated. Larger values of astigmatism would lead in dynamic viewing not only to migrating regions of lack of sharpness but, as a result of the induced distortion, also to unnatural movements of objects.

Figure 4:
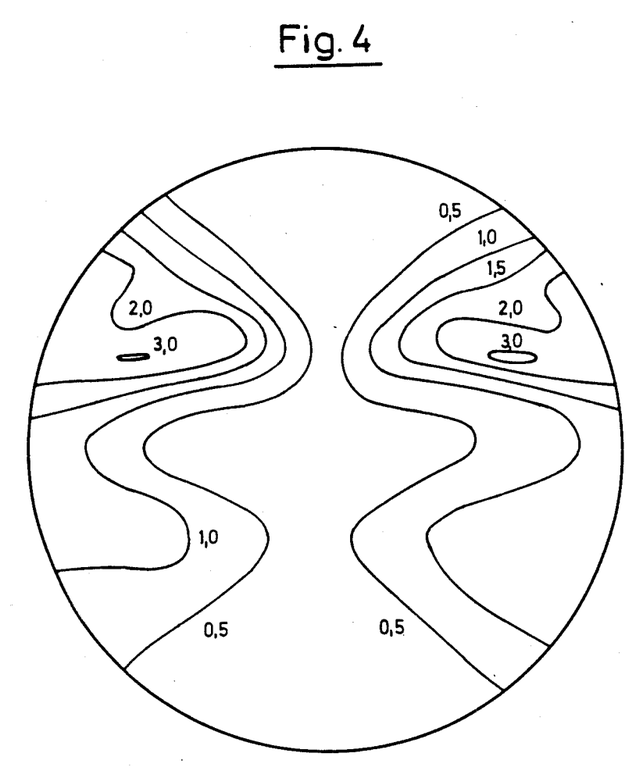
FIG. 4 is a plan view of the progressive-lens embodiment of FIG. 2a, showing the distribution of lines of equal astigmatism.
Figure 5:
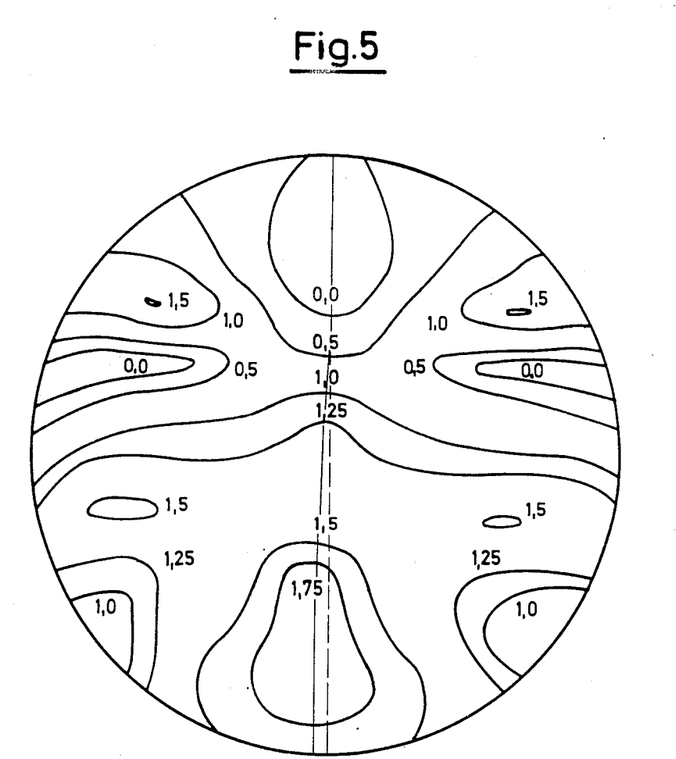

FIG. 4 shows the distribution of astigmatism over the surface of a lens according to FIG. 2a; and it can be seen that in the middle and near regions of the lens, the value of the astigmatism scarcely rises above 1.0 diopter. The power of the spectacle lens is shown in FIG. 5; and it can be seen that in the middle region of the lens, the power remains constant practically to the edge, while in the near region it decreases somewhat in the advantageous manner required In FIG. 5, it can also be seen that, along the principal-sight line, the power of the lens smoothly declines in the upper portion of the middle region 3. In this way, the usable distance range in the middle region becomes greater and the upper progression zone 5 becomes somewhat wider. This variation should, however, not exceed 0.2 times and, to particular advantage, 0.15 times the total dioptric addition since in such case the accommodation of the eye would be noticeably affected. For this same reason, the vertical extent of the middle region 3 should be at least 7 mm.

The height and width of the usable far-distance region 2 depends on the vertical extent selected for the progressive zone 5. The greater the vertical extent of zone 5, the more its useful width increases; on the other hand, if one selects a progressive zone that is too short, the useful far-distance region 2 becomes larger, but lateral portions of the progressive zone 5 are degraded by astigmatic lack of sharpness and by variations in power increase.

Figure 7:
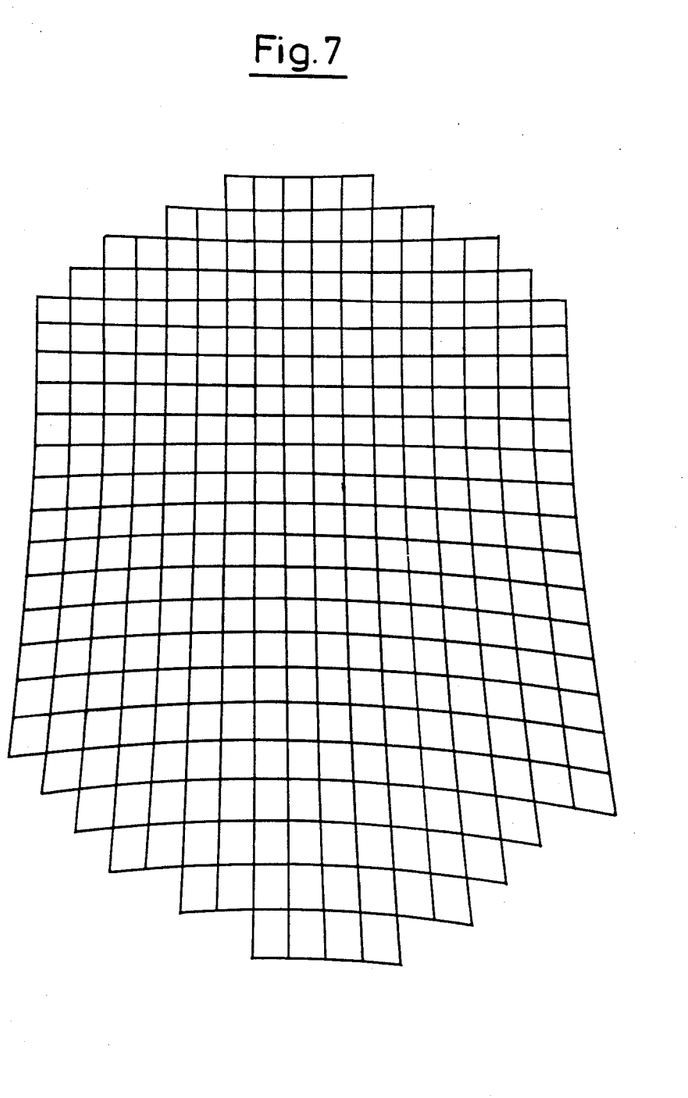

As shown in FIGS. 4 and 5, large usable regions result over the entire progressive lens 1. Furthermore, distortion is user-tolerable for both static and dynamic viewing. This can readily be noted from a glance at FIG. 7 which shows the distortion of an equidistant-object grid by a spectacle lens in accordance with the embodiment shown. It can be seen that one has intentionally dispensed with shaping the progressive surface in such manner that vertical lines are imaged as vertical lines. Rather, the distortion in the far distance region is adapted laterally to the distortion in the near-distance region; and in the far-distance region 2, horizontal magnification increases laterally outward, with the result that vertical object lines are imaged with less strong an inclination. It can be seen that distortion in the far-distance region (dioptric power: 0 diopter) is very slight and that in the course of diopter addition, the permitted distortion is of the type to which the wearer of spectacles is already accustomed, as in use of his normal reading glasses.

If importance is placed on a progressive lens which assures the same viewing conditions for both eyes in every direction of viewing and thus permits undisturbed binocular vision, the foregoing calculation can be performed in such manner that this result is essentially achieved by a suitable predetermination of the dioptric effects in the peepholes, and using principles of symmetry with respect to the principal-sight line, as discussed in said pending U.S. application, Ser. No. 570,589 (now U.S. Pat. No. 4,606,622). Then lens of FIG. 5, which shows the lines of constant average surface dioptric power, is designed according to this principle, and substantial horizontal symmetry is seen to exist at successive horizontal sections and about the principal-sight line 8 of FIG. 1. Specifically, the horizontal symmetry displayed for any horizontal section in FIG. 5 tracks an inclined course of the principal-sight line, as described for curve 8 of FIG. 1, but with the opposite direction of diverging offset from the central vertical-meridian alignment 7 of FIG. 1. The lens shown in FIG. 5 is therefore designed to be used in front of the right eye of the spectacle wearer. In this respect, the principle of such horizontal symmetry for any horizontal section consistently follows the teaching of said Ser. No. 570,589 (now U.S. Pat. No. 4,606,622).

Figure 6:
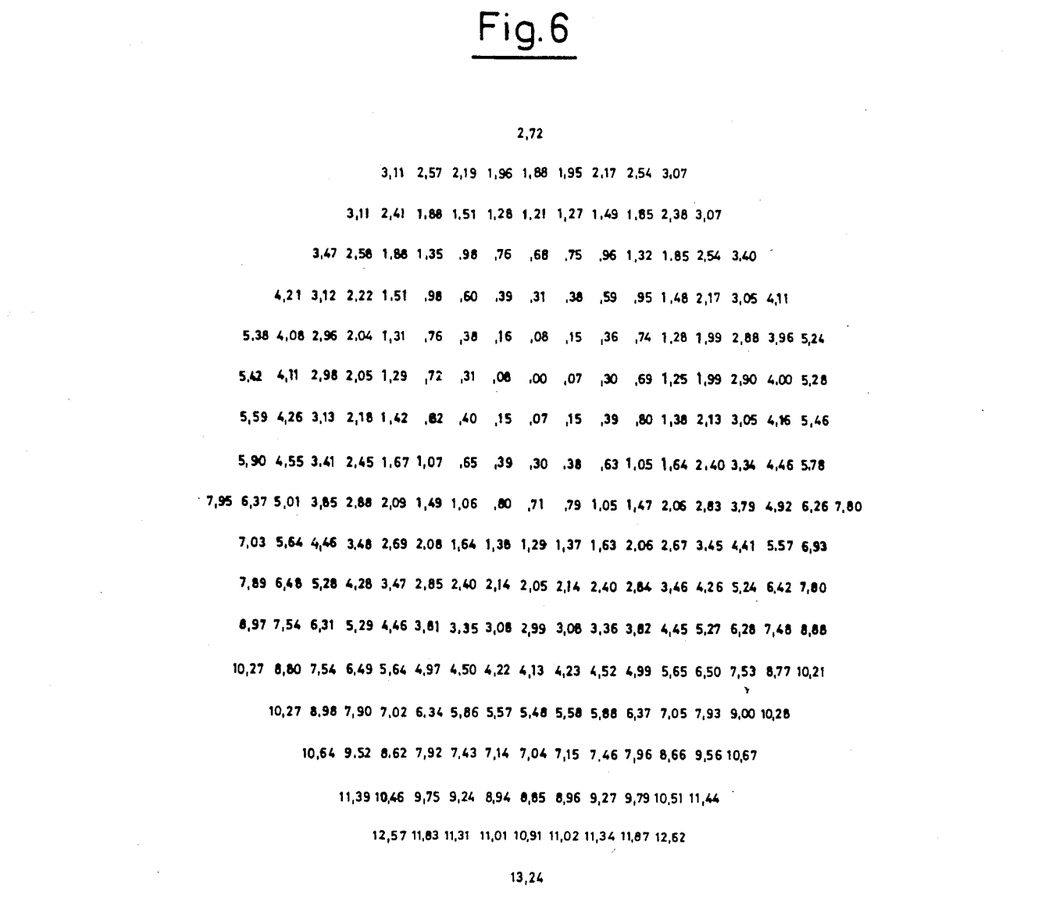

FIG. 6 shows the sagittae of the progressive surface of the lens of FIG. 2a. In this figure, a vertical plane is passed through a point (.00) in the region of the upper progressive zone 5, and the distances (in mm) from this plane are indicated for the points shown.

If one cuts a progressive lens of the invention along horizontal planes, the resultant horizontal sections of the variable-focus surface cannot be described by a conic-section curve.

As pointed out, the progressive lens which has been described and shown is calculated for a given back surface. But it should be noted that the progressive surface corresponding to a preselected back surface can also be used together with back surfaces which deviate in the range of about ±0.5 diopter from the original rear surface, all without imparting recognizable defects in the finished product.

It will be readily understood that, within the scope of the present invention, there can be deviations from the parameters selected for present illustration. Thus, it is possible, for example, to dispense with having the entire progressive surface twice continuously differentiable. For those surface portions (e.g., edge regions) for which the horizontal viewing angle is greater than 25°, i.e., which lie outside the useful field of view, one can dispense with this requirement in order to reduce the distortion within this region or to further reduce the astigmatic lack of sharpness. It may also be advantageous for special uses to progressively increase the power of the lens in the lower part of the near-vision region 4, with consequent need to tolerate a narrowing of this region.

In connection with the drawings, the invention has been described as applied to a progressive lens for use at computer-screen work stations. Other developments of the variable focus lens are also possible, for which an initial example is mentioned in connection with FIG. 2b.

For users who must perform close work in the region above their heads, the invention will be seen to be further applicable to a progressive lens in which the distance region is located at the bottom and the near-vision region is at the top.

Still further, the described invention will be seen to be advantageously applicable to a progressive lens which differs from a traditional progressive lens by the provision of an additional distance-vision region at vertical offset below the near-vision region, there being a progressive zone spacing this additional distance-vision region from the bottom of the near-vision region. Such a lens would, in particular, make it easier for the user to handle stairs.

In the various cases of use, requirements differ as to nature, size and mutual arrangement of the viewing-distance regions as well as the development and vertical extent of the progressive zones. But in all cases, care must be taken that viewing can be effected undisturbed in regions of good imaging which correspond to the particular viewing tasks, and that disturbances outside these regions are small. This is possible, in use of the indicated method of calculation, by suitable change in requirements a, b and c in the example of the lens for a computer-screen work station.

In all cases, it is advisable to keep the vertical distance between the two outer viewing-distance regions at less than 35 mm.

What is claimed is:

1. A multi-focal continuous-focus spectacle lens with at least one progressive surface of progressively varying power which is so shaped that spaced lens regions of different but constant viewing distances pass progressively and continuously into each other, characterized by the fact that said lens has two separate progressive zones (5,6) of continuously varying optical power, which zones are spaced from each other and change the dioptric powers of three viewing-distance regions (upper 2, middle 3, lower 4) continuously into each other, each of said viewing-distance regions being of substantially constant dioptric power, and that the progressive surface is twice continuously differentiable nasally and temporally at least up to a horizontal viewing angle of substantially 25°.

2. A multi-focal spectacle lens according to claim 1, characterized by the fact that between the two progressive zones (5,6) there is a middle viewing-distance region (3) within which the dioptric power varies along the principal-sight line (7,8) by not more than 0.2 times the difference in dioptric power of the viewing-distance regions for the greatest and for the shortest distances.

3. A multi-focal spectacle lens according to claim 2, characterized by the fact that the middle viewing-distance region (3) has a vertical extent of at least 7 mm along the principal-sight line (7,8).

4. A multi-focal spectacle lens according to claim 2, in which within the middle viewing-distance region (3) the dioptric power varies along the principal-sight line (7, 8) by not more than 0.15 times the difference in dioptric power of the viewing-distance regions for the greatest and for the shortest distances.

5. A multi-focal spectacle lens according to claim 1, characterized by the fact that the upper viewing-distance region (2) is associated with distant vision and the lower viewing-distance region (4) with near vision, that the middle viewing-distance region (3) is associated with intermediate vision, and that the increase in dioptric power in the middle viewing-distance region (3) with respect to the dioptric power of the upper viewing-distance region amounts to between 0.4 and 0.8 times the increase in dioptric power between the upper and lower distance-viewing regions.

6. A multi-focal spectacle lens according to claim 1, characterized by the fact that dioptric power in the middle viewing-distance region (3) and within said viewing angle varies by not more than 30 percent of the difference in dioptric power of the viewing-distance regions for the greatest and for the shortest distance, and that dioptric power in the lower viewing-distance region (4) decreases in laterally outward directions within said viewing angle by at most 50 percent of said difference.

7. A multi-focal lens according to claim 1, characterized by the fact that the upper viewing distance region (2) of sharp focusing comprises at least one surface which borders the adjacent progressive zone (5), wherein the border is described by two adjacent sides of a square or rhombus standing with the included vertex at a point on the principal-sight line (7,8) at which point the progression commences.

8. A multi-focal spectacle lens according to claim 1, characterized by the fact that within the useful field of view of the progressive zone (6) between the middle (3) and the lower (4) viewing-distance regions, the value of astigmatism expressed in diopters is contained in the range 1.0 to 1.5 times the difference in dioptric power of the viewing-distance regions for the greatest and for the shortest distance.

9. A multi-focal spectacle lens according to claim 1, characterized by the fact that, in the useful field of view of the progressive zone (5) between the upper viewing-distance region (2) and the middle viewing-distance region (3), the value of astigmatism expressed in diopters does not exceed 3 times the value of the difference in dioptric power of the viewing-distance regions for the greatest and for the shortest distance.

10. A multi-focal spectacle lens according to claim 9 in which said value of astigmatism expressed in diopters does not exceed 2.5 times the value of the difference in dioptric power of the viewing-distance regions for the greatest and for the shortest distance.

11. A multi-focal spectacle lens according to claim 1, characterized by the fact that distortion in lateral areas of the upper viewing-distance region (2) is adapted to distortion in the lower viewing-distance region (4).

12. A multi-focal spectacle lens according to claim 1, characterized by the fact that the lens is developed as a symmetrical lens with a principal-sight line which is the vertically extending meridian (7).

13. A multi-focal spectacle lens according to claim 1, characterized by the fact that the lens is developed as an asymmetric lens which is divided into a nasal region and a temporal region by a principal sight line (8) which extends from the upper to the lower viewing-distance regions as a curve which is inclined towards the nose.

14. A multi-focal spectacle lens according to claim 12 or claim 13, characterized by the fact that astigmatism having a value less than 0.5 diopters is permitted along the meridian (7) and/or the principal-sight line (8).

15. A multi-focal spectacle lens according to claim 1, characterized by the fact that the vertical distance between the upper and lower viewing-distance regions is less than 35 mm.

16. A multi-focal spectacle lens according to claim 1, in which horizontal symmetry of optical properties exists on opposite sides of the principal-sight line.

17. A multi-focal spectacle lens according to claim 1, characterized by the fact that the middle viewing-distance region (3) is associated with distant vision and the upper and lower viewing-distance regions, (2,4) are respectively associated with intermediate vision and near vision.

* * * * *